US007152682B2

(12) United States Patent
Hopper

(10) Patent No.: US 7,152,682 B2
(45) Date of Patent: Dec. 26, 2006

(54) SUBSEA PROCESS ASSEMBLY

(75) Inventor: Hans Paul Hopper, Aberdeen (GB)

(73) Assignee: Cameron International Corporation, Houston, TX (US)

( * ) Notice: Subject to any disclaimer, the term of this patent is extended or adjusted under 35 U.S.C. 154(b) by 0 days.

(21) Appl. No.: 10/510,525

(22) PCT Filed: Mar. 24, 2003

(86) PCT No.: PCT/GB03/01254

§ 371 (c)(1),
(2), (4) Date: Oct. 7, 2004

(87) PCT Pub. No.: WO03/087535

PCT Pub. Date: Oct. 23, 2003

(65) Prior Publication Data

US 2005/0145388 A1 Jul. 7, 2005

(30) Foreign Application Priority Data

Apr. 8, 2002 (EP) .................................. 02252503

(51) Int. Cl.
E21B 29/12 (2006.01)
(52) U.S. Cl. ....................... 166/357; 166/351; 210/110
(58) Field of Classification Search ................ 166/357, 166/351; 210/110
See application file for complete search history.

(56) References Cited

U.S. PATENT DOCUMENTS

| 4,134,024 | A | | 1/1979 | Wiseman | |
|---|---|---|---|---|---|
| 4,248,305 | A | * | 2/1981 | Scarbrough et al. | 166/305.1 |
| 4,369,373 | A | * | 1/1983 | Wiseman | 290/2 |
| 4,443,707 | A | * | 4/1984 | Scieri et al. | 290/4 R |
| 4,678,922 | A | * | 7/1987 | Leininger | 290/54 |
| 4,824,447 | A | * | 4/1989 | Goldsberry | 96/9 |
| 4,829,196 | A | * | 5/1989 | Bronicki et al. | 290/54 |
| 4,848,471 | A | * | 7/1989 | Bencze | 166/335 |
| 4,848,475 | A | | 7/1989 | Dean et al. | |
| 4,900,433 | A | | 2/1990 | Dean et al. | |
| 5,117,908 | A | | 6/1992 | Hofmann | |
| 6,197,095 | B1 | * | 3/2001 | Ditria et al. | 95/248 |
| 7,093,661 | B1 | * | 8/2006 | Olsen | 166/357 |
| 2002/0129938 | A1 | * | 9/2002 | West et al. | 166/267 |
| 2004/0069494 | A1 | * | 4/2004 | Olsen et al. | 166/357 |
| 2004/0099422 | A1 | * | 5/2004 | Lush et al. | 166/357 |

FOREIGN PATENT DOCUMENTS

| GB | 499 024 | | 1/1939 |
|---|---|---|---|
| WO | WO01/20128 | * | 3/2001 |

OTHER PUBLICATIONS

International Search Report for Appln. No. PCT/GB03/01254dated Jul. 9, 2003 (pp. 3).

C. H. Rowlins, et al.: *Design and Analysis of a Multiphase Turbine for Compact Gas-Liquid Separation*; SPE Production & Facilities; Feb. 2002 (pp. 47-52).

* cited by examiner

*Primary Examiner*—Thomas A Beach
(74) *Attorney, Agent, or Firm*—Conley Rose, P.C.

(57) ABSTRACT

A subsea process assembly for separating a multiphase flow, the assembly comprising: an inlet for a multiphase medium; a pressure reducing means for reducing the pressure of the multiphase flow from the inlet and creating a source of energy; a multiphase separator for separating the multiphase input into individual phases; and a pumping system for, in use, pumping at least one of the desired individual phases to a delivery point by utilizing at least some of the energy from the source of energy.

23 Claims, 12 Drawing Sheets

SUBSEA PROCESS ASSEMBLY

CROSS-REFERENCE TO RELATED APPLICATION

This application is a National Phase entry of PCT Application No. PCT/GB03/01254 filed Mar. 24, 2003 which claims priority to EP Application No. 02252503.4 filed Apr. 8, 2002, both of which are incorporated herein by reference.

BACKGROUND OF THE INVENTION

The invention relates to a subsea process assembly which can be used when extracting materials such as hydrocarbons from subsea environments and, in particular, to an assembly which separates a multiphase flow into individual component flows for further supply to specific locations.

In general, the current practice for development of subsea hydrocarbon fields is on a macro field approach which uses a plurality of subsea wells connected through a subsea infrastructure, pipelines and risers to a surface process facility, such as a floating production vessel or a platform. In many locations, especially in remote areas, the proportion of gas and water within the fluid produced by the well is significant and is generally a surplus product, when compared to the oil which it is usually desired to retrieve. The gas and water has to be safely and cleanly disposed of in a manner which does not damage the environment.

A solution for such a system is that gas and water which have been taken out of the well and which are separated at the surface can be pumped back to the seabed to be reinjected at the seabed into subsea wells. This reinjection reduces the rate of decline of the reservoir pressure allowing the field to produce longer. To increase the rate of production, energy must be supplied to the production steam using either downhole or seabed methods.

Overall, the current approach requires a complex field production system which has numerous pipelines, thus incurring a high field capital expenditure and operational expenditure. This high expenditure reduces the commercial ceiling at which the field can be operated viably. As the field matures and production declines, a level is reached at which considerable resources are left in place but at which it is no longer commercially viable to operate the well.

Conventionally, the flow which is achieved from a subsea well is directed to a surface production vessel. Back pressure on the well reduces the production rate and brings on an early decline of the wells flowing life as the reservoir pressure at the bottom of the well must overcome the hydrostatic head and the pressure caused by friction. Therefore the well depth, the distance along the seabed and the water depth are all contributing factors against the reservoir pressure. At a certain stage, the well ceases to produce a useable flow when a significant proportion of the desired fluid remains in the reservoir area drained by the well. Energy can be added to the production stream, either downhole, at the wellhead or in the riser. The input of energy increases the cost of the well, thereby reducing the commercial viability of the well and, in some cases, the entire field.

In deep water or for wells at a considerable distance, such as over a number of kilometres from the surface production vessel, the production rate decline or the energy input causes the commercial value of a field to be reduced. The early non-viability of the field means considerable valuable resources such as the non recovered natural resources are left in situ. Accordingly, and especially in deep water, the limited production rates, the early decline and the higher costs result in an increased investment requirement with a lower rate of return. This ensures that small and medium sized fields cannot be exploited fully, if at all, using current practices.

When wells are at a considerable horizontal distance along the seabed from the surface production vessel, a number of significant problems such as slugging, hydrates, waxing and an increased back pressure are caused by the distance that the production fluid must travel. In addition, using gas artificial lift in the well can exacerbate these problems causing pipelines to require higher specifications and larger diameters, thereby increasing the cost.

In order to maximise the production capability of a well, well operators are considering solutions which are based on the macro field approach and these include downhole gas lift or pumping, seabed drive, multiphase pumping, gas/liquid separation, hydrocarbon/water separation, individual well gas/liquid separation and three phase separation.

As the pressure in the reservoir declines and at different rates in different parts of the field, the volume produced from the wells will also decline. This also applies in reverse to the injection wells. To maintain an effective production rate will require the addition of artificial lift in the wells that will increase the seabed wellhead flowing pressure. This means that, in pumped wells, a considerable amount of gas will still be in solution at the wellhead.

Downhole pumping typically uses either electric submersible pumps or hydraulic submersible pumps which have to be installed in all commingled wells. The reasons for this is that unpressurised wells cannot flow into a pumped pressurised commingled system. Therefore, a totally pumped field approach has to be taken and pumping has to be installed in some wells that could flow naturally or they need their own pipeline which is very costly. Accordingly, energy and therefore costs are spent on wells which did not require them. These pumps are effective because they are preferably set in the well below the gas bubble point and therefore only have to pump a liquid. Also, the same subsea infrastructure, pipelines and riser systems are still required. Accordingly, the pumping requirements add to the conventional field capital expenditure and also increase the operational expenditure of the field.

In a macro field approach, the wells produce flowing up to the subsea trees along to a manifold for commingling where the flow from individual wells is commingled and then the multiphase fluid flows to the surface via pipelines and risers. For commingling to occur, higher and medium pressured wells need to be choked back to the lowest pressure of a commingled well, thereby losing energy from the flow stream. To reduce the back pressure caused by the pipelines, methods for providing energy to the flow stream downstream of the manifold, such as additional pumps, may be used. As the fluid flows up the well the gas will come out of solution once it is above the bubble point, thereby causing a gas/liquid flow at the wellhead. However, such multiphase pumps require additional energy which increases the cost of this approach. The requirements for pumping this free gas are very different and, in many cases, opposite to those required for pumping liquid and therefore there is a design conflict and, at best, only a poor compromise can be achieved. Therefore it is preferable to separate the fluid into gas and liquid which can be directed to suitable gas pumps and liquid pumps. As friction losses along a pipeline reduce the pressure, more and more gas comes out of the liquid solution, possibly forming 50 to 100 metre slugs of gas. It should be considered that this gas does not need pumping due to the low gas friction factor and low gas hydrostatic head, and can ficely travel along its own pipeline. It is the liquid slugs that have to be pushed along by the compressed gas. Accordingly, the energy used by a multiphase pump to compress the gas to achieve a pressurised multiphase flow is unnecessary if a separate gas flow line is used.

Subsea gas/liquid separation and pumping partially takes advantage of the wellhead at the seabed and water depth. The gas is separated at a lower pressure than the lowest pressure point in the pumped liquid pipeline. Such a system is described in U.S. Pat. No. 4,900,433 and this uses drilling practices and a conventional subsea conductor as a separator housing. Due to the conductor size, a maximum throughput of about 30,000 barrels per day is what can be expected from such a system. The system shown in U.S. Pat. No. 4,900,433 follows conventional practices in flowing to a surface installation but now requires two small pipelines, one for gas and one for liquid, instead of one large multiphase production pipeline.

An alternative separation approach is a hydrocarbon/water separation system. The reason for separating the water from the hydrocarbon is that, when the wells are produced into the system, surface installations need not handle the increased volume of fluid, in particular, caused by the water. By reducing the water at the seabed, the surface installation can operate on a greater number of wells. Oil/water separators are usually gravity separators and require sufficient standing time for the hydrocarbons to float up and the water to sink down. The water is then pumped into a water injection well with the unassisted hydrocarbons flowing in a pipeline to the surface vessel. The gravity multiphase separator does not provide energy to the well stream, except by the effect of later allowing the elimination of the hydrostatic head caused by the removal of the partial pressure exerted by the water in the multiphase fluid. This approach is a solution to solve a specific field symptom such as a production fluid train bottleneck caused by a standard macro field system approach. To increase the production rate, the multiphase hydrocarbon flow can be pumped.

Three phase separation has been attempted and this has been based on a macro field approach with the objective of using horizontal gravity separators, similar to those used on the surface but now on the seabed.

An alternative approach is covered in U.S. Pat. No. 4,848,475. A production and process method is described which utilises single units from U.S. Pat. No. 4,900,433 for each well prior to the flow from the well entering respective gas and liquid pipelines. The individual units allow wells to flow at their maximum production rate with the separator operating pressure being dropped to the allowable pressure to deliver the gas, and the pumped liquid to the surface where further separation on the surface vessel can occur. Accordingly, the deeper the water in which the well is located, the more effective this system is at reducing the individual back pressure on a well. This can delay the need for artificial lift, such as gas lift or downhole pumping, and reduces the reliability issues due to the reduction in the downhole complexity. However, the disadvantage of such a system is that the capital expenditure is extremely high and the complexity of operating such a system are significant. This form of operation has only been considered on a macro approach and therefore considerable energy will need to be supplied to each unit to deliver the liquid back to the surface and on the surface for reinjection.

To achieve separation of gases and liquids, several parameters must be met. Typically in oil wells, some gas will be in solution in the water and oil mixture and the amount of gas in solution is dependent on the pressure of the fluid. In order to separate the gas from the liquid, the pressure must be reduced, thereby lowering the bubble point and allowing gas bubbles to form. The pressure level will set the amount of the gas which is released from the solution and no further gas will be given up until the pressure of the liquid is reduced further. Once gas has been released, it is slow to be reabsorbed into the liquids and therefore repressuring the gas and injecting it into the liquid line will not prevent separate two phase flow and the forming of slug flows.

Once the gas bubbles have formed, the difference in density of the gas to the liquid is significant and this means that the gas will separate readily from a liquid which can be achieved under gravity in approximately a number of seconds for a small volume. Again this time increases as the volume is increased, thereby requiring a large and costly system.

The friction in a horizontal pipeline will cause the pressure in the fluid flow along the pipeline's length to decrease and therefore, even if all of the free gas is removed at the start of the pipeline, a further release of gas will occur along the pipeline due to the pressure drop and this will collect and form a slug, especially in the upper part of an undulation in a pipeline. Each upper part of an undulation will cause a pressure drop in its own right, thereby resulting in a higher pressure being required at the head of the pipeline to move the fluid. To prevent this from occurring, the pressure of the fluid at the wellhead is preferably reduced beyond the lowest pressure point in the pipeline. Alternatively, if a certain amount of gas is required at the surface facility, then the pressure at the head of the pipeline need not be as low but against the penalty of having a higher wellhead flowing pressure.

In a riser, the pressure change or drop is considerable due to the hydrostatic gradient. Gas breakout in the riser or just prior to the riser base will reduce the density of the fluid and of the hydrostatic head and will therefore cause gas lift in the riser. This is acceptable if the gas is required at the surface facility but, if not, then top side separation facilities, pumping equipment, a gas re-injection riser and a gas pipeline back to the wellhead site are also required.

For separation of liquids, it is not possible to use differences in pressure changes as this has little effect on the liquid density. Accordingly, the ability of molecules to move freely depends on the difference in mass, the viscosity of the prime liquid and the surface tension. By increasing the droplet size and its ability to coalesce, a greater mass force is available to overcome the restraining forces, thereby helping the fluids to separate. The ability to allow a fluid to coalesce and collect on wetted surfaces, walls or plates also improves separation.

To achieve separation of a multiphase flow, a first step must be to create a low pressure physical state by first dropping the pressure at the seabed to the surface delivery point requirement. Turbulent flow will continue the mixing and therefore a large volume is required into which the flow passes to allow the fluid flow to stabilise and form a uniform profile. A low velocity and a steady flow encourages such a profile. As mentioned above, separation is typically dependent on mass. A simple technique therefore is to use a sealed settling tank in which gas is quickly given up but, for different liquids, the velocity of the flow has to be reduced drastically to allow effective gravitational separation. This therefore results in large tanks or a very small throughput of separated fluids. This has serious limiting factors subsea due to collapse and burst requirements.

However, if a fluid is rotated or allowed to rotate by tangentially entering a circular container, the gravitational force can be significantly increased from normal earths gravity to approximately ten fold or higher i.e. 100 or 1000. By increasing the force, the separation process can be speeded up and this ensures that small fluid containers can be used. Cyclones or a fluid vortex created in a cylinder are effective methods and these reduce the time required for separation but these can only handle a small volume of fluid and at specific parameters.

At high gravitational forces, typically above 20 G, shear forces are created in a moving fluid compared to a rotating stationary fluid in a centrifuge. These do not effect solids in the liquid but will break down the size of liquid droplets, and possibly create an emulsion. Reduced droplet sizes will considerable extend the time required to achieve separation. Therefore, creating a very high gravity force is effective for removing solids. For liquids, efficient separation of the flow stream occurs between 10 and 20 G.

In the macro field concept, the producing wells are choked down to allow commingling with the flow from the lowest pressured well. The commingled multiphase flow to a platform then enters a surface installation field separator to separate off the gas and to allow liquid pumps to pressurise efficiently the respective fluid phases to allow for production or re-injection. The pressure in a gas re-injection line or a water-reinjection line supplied by the surface installation has to be sufficiently high to meet the injection pressures of the highest pressurised injection well. This therefore requires chokes on the re-injection wells that have a lower injection pressure. This shows that in the macro field well stream system, energy is lost that then has to be replaced by pumping, and energy has to be provided to pump up the re-injection phases with a considerable amount being lost on the low pressured injection wells.

Currently the tendency is to flow all the produced fluids to the surface installation because of the magnitude of the cost and the ability to operate and control a macro subsea field separation system.

BRIEF SUMMARY OF THE PREFERRED EMBODIMENTS

The present invention aims to overcome the problems described above.

According to the present invention, there is provided a subsea process assembly for separating a multiphase flow, the assembly comprising:

an inlet for a multiphase medium;

a pressure reducing means for reducing the pressure of the multiphase flow from the inlet and creating a source of energy;

a multiphase separator for separating the multiphase input into individual phases;

a pumping system for, in use, pumping at least one of the desired individual phases to a delivery point by utilising at least some of the energy from the source of energy.

The pumping may be powered by utilising a variable controllable amount of the energy from the source of energy.

Preferably, the pressure reducing means is coupled to a hydraulic power drive or alternatively to an electric power drive or a flow controller, such as a choke, depending on the optimum method whether hydraulic, electrical or pneumatic is used for distributing the power.

Preferably, the assembly further comprises a control process module for controlling the pressure reducing means and the pumping system.

Preferably, the process assembly also includes a power drive unit that generates hydraulic power from an external energy source. The external energy source may be either electrical or fluid energy. The power drive unit and/or the pressure reducing means may be driven by a fluid which provides energy in the form of liquid or gas. The wellstream energy may be achieved by creating a pressure differential in the multiphase flow between the inlet and the separator, for example by reducing the pressure of the multiphase medium. The module may further comprise a drive fluid inlet, the drive fluid being pumped to the module from an external point. The pressure reducing means may also comprise a means for creating a pressure differential in the drive fluid, for example by reducing the pressure of the drive fluid, thereby creating a further source of energy. The drive fluid may be water from a water injection supply. If an external electrical supply is available instead of using drive fluid, then this can be used directly to supplement the electrical power obtained from the well stream electrical power drive.

This description describes an approach where energy from the well stream and the second energy source are converted into hydraulic power for distributing the power to the various power consuming modules. Alternative power distribution methods can be considered being electric or pneumatics. In certain locations there is no need to support the reservoir pressure by injecting water, and therefore to supply the supplementary power can be provided more efficiently using preferably electric energy but pressurised dead crude or gas could be considered. An electric secondary energy source could be used directly if the power distribution on the module is electric or the electric energy could drive an electric hydraulic power unit if the power distribution is hydraulic.

Preferably, the pressure of the multiphase fluid supplied to the separator is reduced to a level specified by the surface installation or below the lowest pressure in a pipeline to the delivery point. The pressure of the multiphase flow may be reduced to below 25 atmospheres.

The separator may be one of the following: a centrifugal container, a vortex tube, a cyclone, helix container or auger, a gravity vertical or horizontal tank, a silo, a conductor pile housing, toroidal ring, a toroidal sprial combination or a spiral. A suitable toroidal separator is described in our co-pending European patent application, entitled "Separator" and filed on the same day (agents's ref: MJB07104EP).

Preferably, the separator is arranged to separate the multiphase fluid into solids, gas, oil and water although it may be arranged to separate a multiphase fluid into two or more of these or, in fact, to remove, for example only gas from the remaining phases.

Preferably, the assembly also comprises an individual pump for each phase. The pumps may be driven using energy created in the assembly.

The assembly preferably further comprises a means for, in use, reinjecting surplus gas and water and possibly the solids slurry which have been separated either back into the reservoir or to a specified delivery point.

The assembly preferably also comprises a template, a piping mat and a retrievable subsea process module. The retrievable subsea process module may comprise a retrievable base module and retrievable mini modules.

Additionally, the subsea process assembly may comprise a solids removal module for removing solids, such as sand, prior to separation of the fluids in the form of a solids slurry.

The present invention also provides a subsea hydrocarbon recovery system comprising:
- a subsea well for supplying a multiphase fluid;
- a subsea process assembly according to any one of the preceding claims, wherein the inlet to the assembly is in fluid communication with the well; and
- a delivery point for receiving the recovered hydrocarbon(s) from the subsea process assembly.

The system preferably further comprises a well into which surplus products of the separator, such as water, gas or the solids slurry can be reinjected.

The system preferably comprises a plurality of subsea wells, each well or set of wells having an associated subsea process assembly using a process module which supplies the recovered hydrocarbon(s) to the same delivery point for further supply to a delivery point.

The delivery point is preferably one of a pipeline for removing the product from the field, a water injection well, a gas injection well or a producing well to achieve artificial lift.

This invention describes a system that can achieve three phase separation on the seabed down to the same degree or lower than a surface first stage separator and which is tailored to suit the production of an individual subsea well, with the ability to supply each phase at a separate pressure suitable for either exportation to the topside whether near or far, or for re-injection tailored to suit local re-injection well requirements, and all with a minimum of energy consumption from an external source.

Therefore a process assembly that can be connected to a well or set of compatible wells and that can simulate a top side surface separator will, effectively, have eliminated the effects of water depth and any downstream back pressure handicaps. This can now allow the well to flow at surface conditions but on the seabed. In water depth from 1000–3000 m this difference allows a considerable increase in production and the recoverable hydrocarbons.

Being able to vary the input pressure into the process assembly will allow each well to be treated individually, increasing the efficiency of production and the reservoir management of the area drained by the well.

The first step, and also at later suitable opportunities in the system, is the removal of harmful solids which can cause sever damage and/or blockage to values, choke, separators, pumps, pipelines and risers. In addition there is the ability to monitor individual sources and then to take suitable action.

The next step is to process the fluid. To allow an individual well or set of similar wells to produce at their optimum level requires an individual process assembly capable of accepting a certain volume at the required pressure. This can vary according to the top side requirements and on the changing effects in the reservoir. To achieve separation levels equivalent to a topside first stage separator, the process assembly operates down to surface separator pressures. This is to ensure that a maximum level of gas and water are capable of being removed from the oil. An individual process assembly, in the form of a process module, maximises the potential of this pressure difference by harnessing the maximum amount of energy between the wellhead flow system and the inlet to the separation system.

The operating pressure of the process module is dependent on the level of gas separation required. The ability to separate the flow into distinct phases allows each phase to be monitored and measured (i.e. velocity and density) which eliminates the need for a test line from the field to the surface installation.

The process module has the capability to re-pressurise each phase separately to suit the delivery point. Pump modules for a phase can be assembled in series to achieve high pressures, or in parallel if there are two different delivery points for an individual phase. This allows the gas and/or water to be re-injected into local injection wells at their optimum injection pressure instead of into a higher pressure common field injection line. This ability to individually select the pressure also allows the use of either pressurised gas to gas lift the producing well or to use pressure oil or water as the drive liquid to operate the turbine of a hydraulic submersible pump in the producing well.

The capability to re-inject the gas or water or both removes the expanding problems caused by gas and/or the volume of water in the pipeline back to the riser base of the surface installation. Also the removal of water from the pipeline means the partial differential back pressure caused by water in the riser is eliminated. The removal of either gas or water or both results in a considerable reduction in the size of the resulting production pipeline and riser, and the need not to install any downhole or seabed pumping requirements and its associated energy consumption, the topside process facility, re-injection pump equipment and its associated energy consumption, and the re-injection pipelines and risers. This is all in addition to the elimination of the test line.

To achieve these benefits, energy is required by the process module. The priority is to obtain available energy from the well stream, but then to back this up where needed. Where a reservoir requires water injection, the water injection pipeline is operated at a higher pressure with the process module using this pressure difference. This is a small change that does not require any additional operations and may be already within the water pipeline specification range.

The process module will require additional power if there is a insufficient wellhead flow pressure due to reservoir characteristics. In addition when a closed in well is being brought on, the pump modules will require power before the well stream has developed. It is possible that if a well and its process module are in full production, it has the capability of producing a quantity of surplus power This then could be cascaded to another well location to bring other wells on without requiring the need to use an external energy supply. If a process module has sufficient power for its requirements which is not using all the well stream power, then when full capacity is reached, the chokes on the various inlet units would be used to control the flow pressure.

In addition the process assembly may consider temperature control of the fluid in respect to insulation and a heat transfer system. When gas is de-pressurised, cooling will occur and when compressed, a temperature rise will occur. Maintaining a minimum temperature is important to prevent waxing, asphatines and hydrates forming in the system. Also, downstream of a pump, the energy used will have been converted into waste heat. Beside insulation on the fluid containment hardware, a heat transfer system from the pump modules to especially the power drive units is recommended.

The process module processes the well stream to meet the constantly changing parameters of the field due to the surface installation requirements, and it optimises its delivery based on the well flowing characteristics. This requires a fast active control system that can process the information from various sources and manage the process system by operating the flow control mechanisms, flow selection devices and pressure barriers. This includes self diagnostics and emergency shut-down management of itself and the well.

BRIEF DESCRIPTION OF THE DRAWINGS

For example the present invention will now be described with reference to the accompanying drawings, in which.

DETAILED DESCRIPTION OF THE PREFERRED EMBODIMENTS

Figure 1:
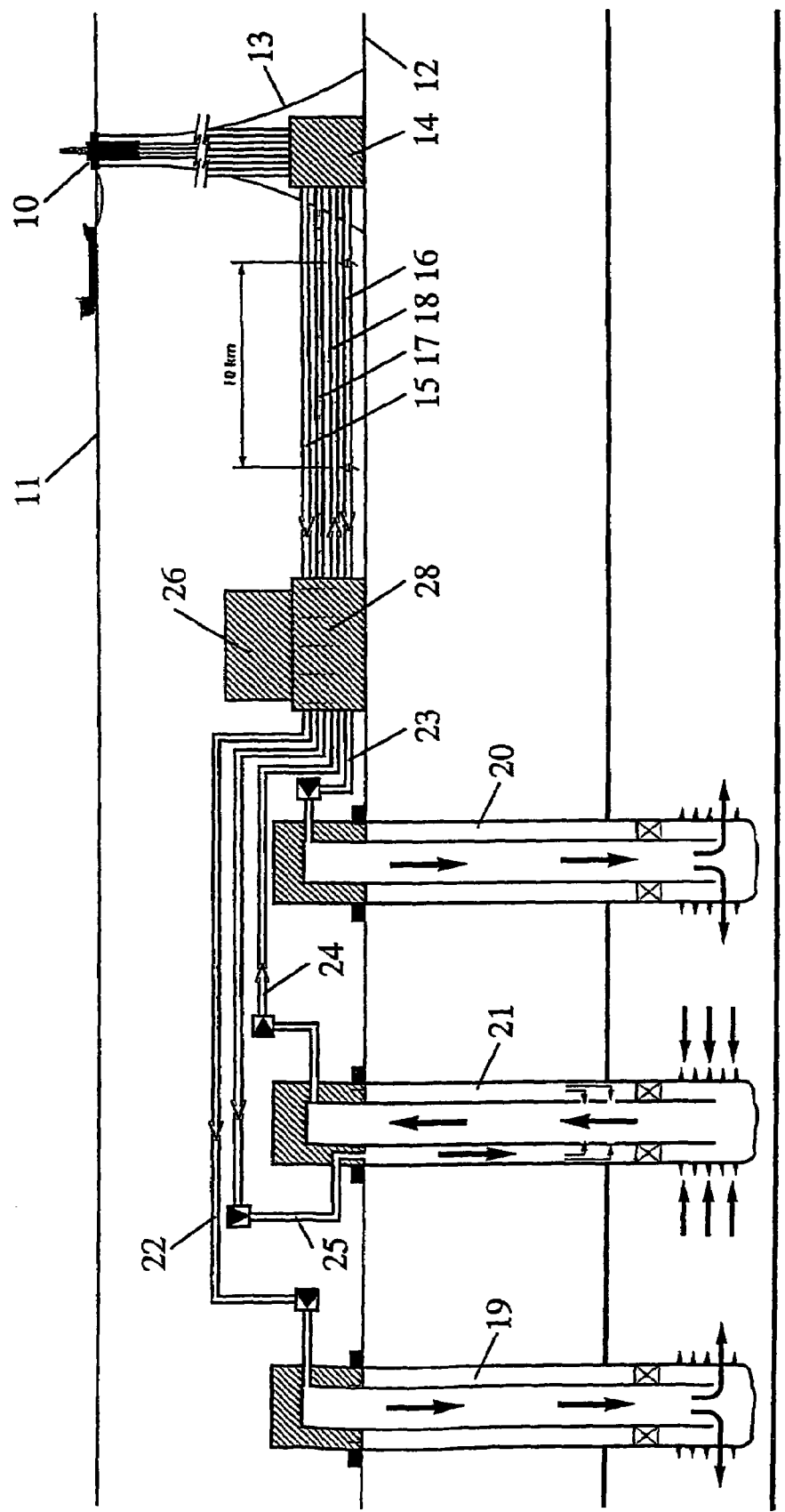
FIG. 1 shows a schematic arrangement of a conventional subsea production system.

FIG. 1 shows a conventional subsea production approach in which a relatively stationary production installation 10 is provided on the surface in the sea 11. The installation 10 is connected to the seabed 12 by means of ties 13 to anchor it in position. A series of flow risers connect the installation 10 to a riser base 14. Pipelines are provided for the flow of gas 15 for reinjection, water 16 for the injection, a test flow line 17 and a production line 18 for the supply of the produced product from the wells to the surface installation.

On the seabed 12, a number of typical field wells 19, 20 and 21 have been installed. For example, well 19 is a gas injection well and well 20 is a water injection well. Each of these are used to reinject gas and water respectively separated out on the surface installation 10.

Gas injection well 19 is connected to a gas injection line 22, the water injection well is connected to a water injection line 23 and a typical gas lifted production well 21 is connected to a production line 24 and to a gas lift line 25. The two sets of flow lines 15, 16, 17, 18 and 22, 23, 24, 25 are connected respectively via a manifold 26 located on a template 28 positioned on the seabed 12.

Although not shown in FIG. 1, a plurality of production wells 21, water injection wells 20 and gas injection wells 19 would be connected via a single manifold 26. Accordingly, the pipelines 15, 16 and 18, and the corresponding portions running from the riser base 14 to the installation 10, need to be significantly larger than those running from the manifold to the individual wells. As all the wells are individually choked and connected to the manifold where they are selectively valved and connected to the respective common pipeline, this is known as a macro field system.

Figure 2:
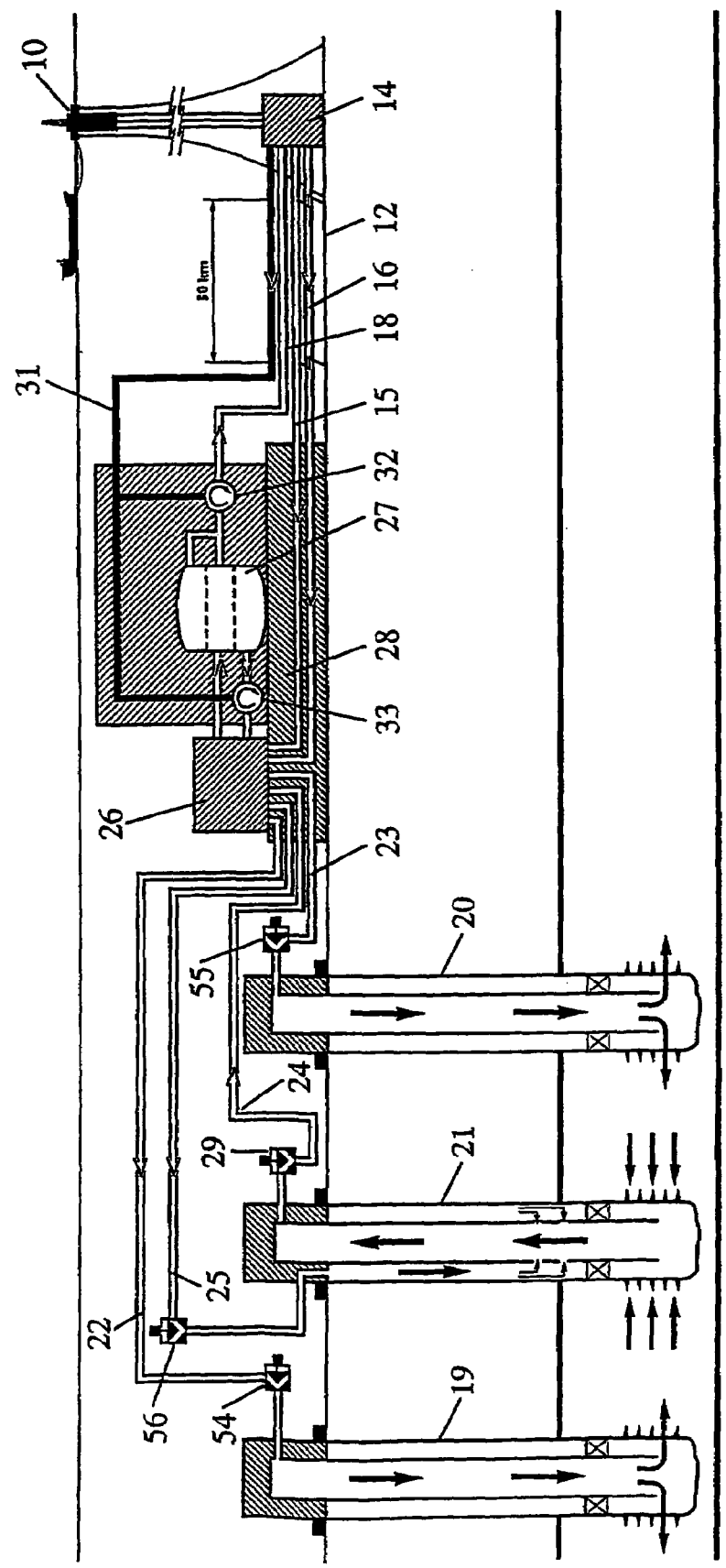
FIG. 2 shows a schematic cross sectional view of a conventional subsea commingled separation operation system.

In FIG. 2, a subsea three phase separation system is shown in which a multiphase separator 27 is provided between manifold 26 and the flow line 18. The remaining features are similar to those in the system of FIG. 1 and like reference numerals are used. The manifold 26 and the separator 27 are mounted on a template 28 through which a number of the flow lines pass, such that the manifold and the separator can be treated as separate modules which can be replaced, without the need for replacing the entire subsea structure. An electric power supply 31 is provided to drive the multiphase pump 32 and water pumps 33 as required.

In this example, the separator is a simple gravity separator, although more complex separators could be utilised.

A choke 29 is provided between the output from the production well 21 and the inlet to the manifold 26 so that the flow through the manifold is at the lowest common field pressure from the various production wells in the field. The choke 29 reduces the pressure where necessary and this leads to a loss of power in the flow and therefore a loss of energy. This energy cannot be recovered. Chokes 54 and 55 are also provided on the gas injection wells 19 and on the water injection wells 20 respectively. Again the pressures in the gas injection pipeline 22 and the water injection pipeline are sufficiently high to meet the needs of all the wells connected to it. A choke 56 is also provided on the gas lift line 25 to the gas lifted production well 21. Again, for some wells, the supply pressure is above the requirement which is lost after it is choked down. This follows the macro field approach.

Figure 3:
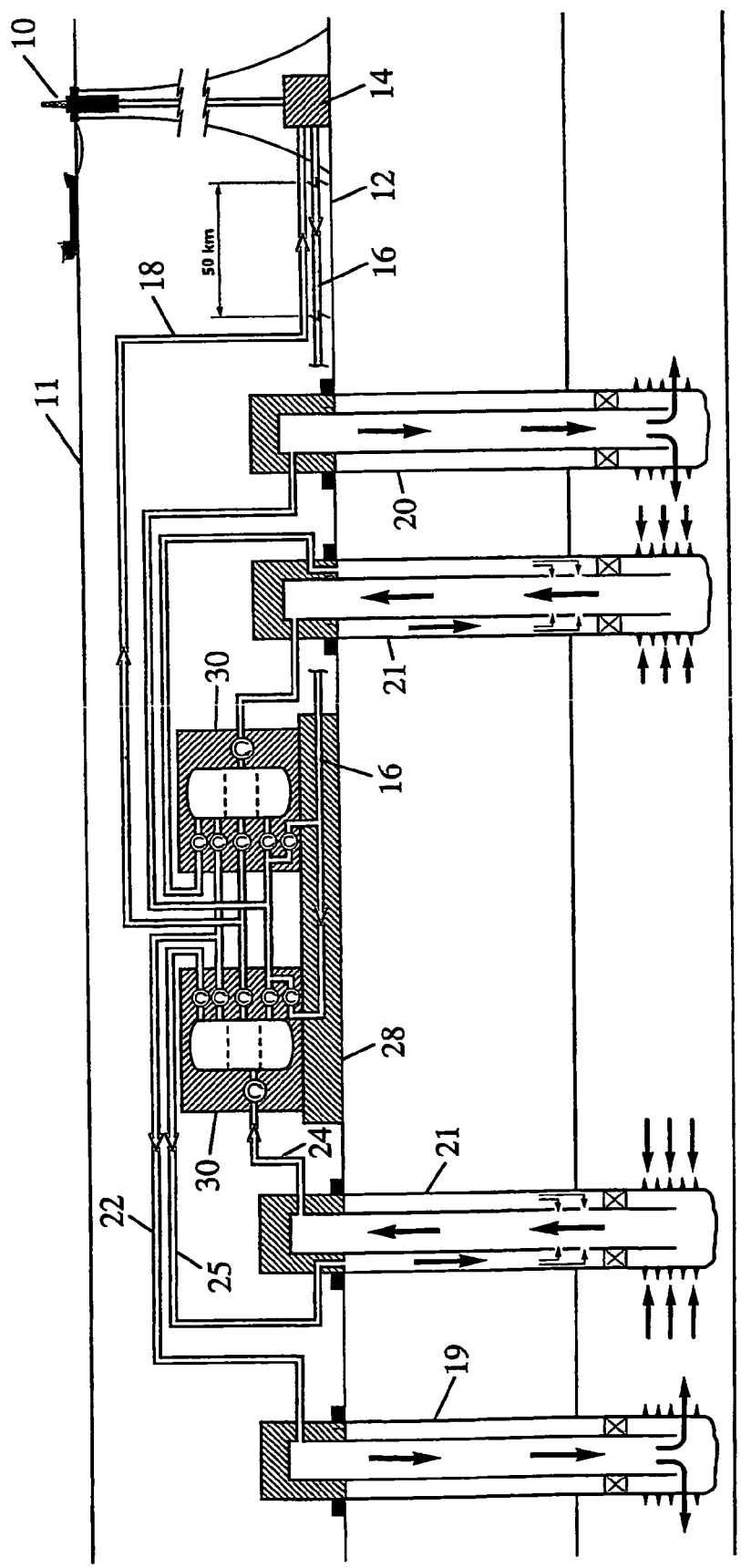
FIG. 3 shows a schematic cross sectional view through a system according to the present invention.

FIG. 3 is directed to a production system which utilises a preferred subsea process assembly according to the present invention. Like reference numerals have been used for common features between the present invention and the embodiments described in FIGS. 1 and 2.

The subsea process module 30 is a self contained, stand alone unit that can be positioned at a point between the output of a well and the export oil line 18. Several production wells 21 can supply the same process module 30 but each well 21 is preferably provided with its own individual process module 30. This individual well system could be called the micro field approach.

Figure 4:
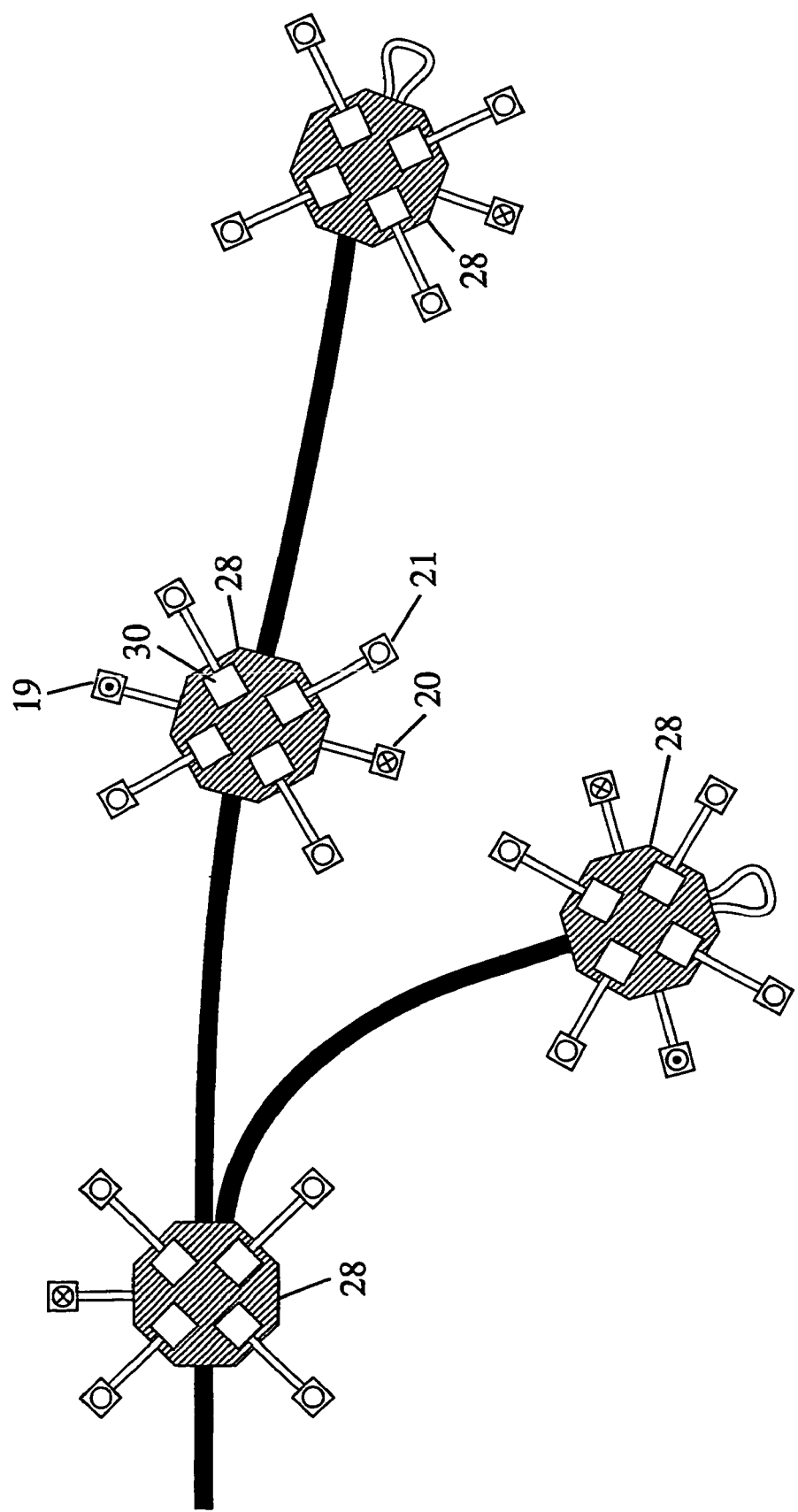
FIG. 4 shows a schematic plan view of part of a field, using the present invention.

As can be seen from FIG. 4, each template 28 may include a plurality of process modules 30 connected to individual production wells 21. A single gas injection well 19 and a single water injection well 20 can be used for more than one production well 21. Individual templates 28 can be connected together such that they supply a single pipeline bundle to the surface and possibly a set of flow lines for individual template flow communication.

Figure 5:
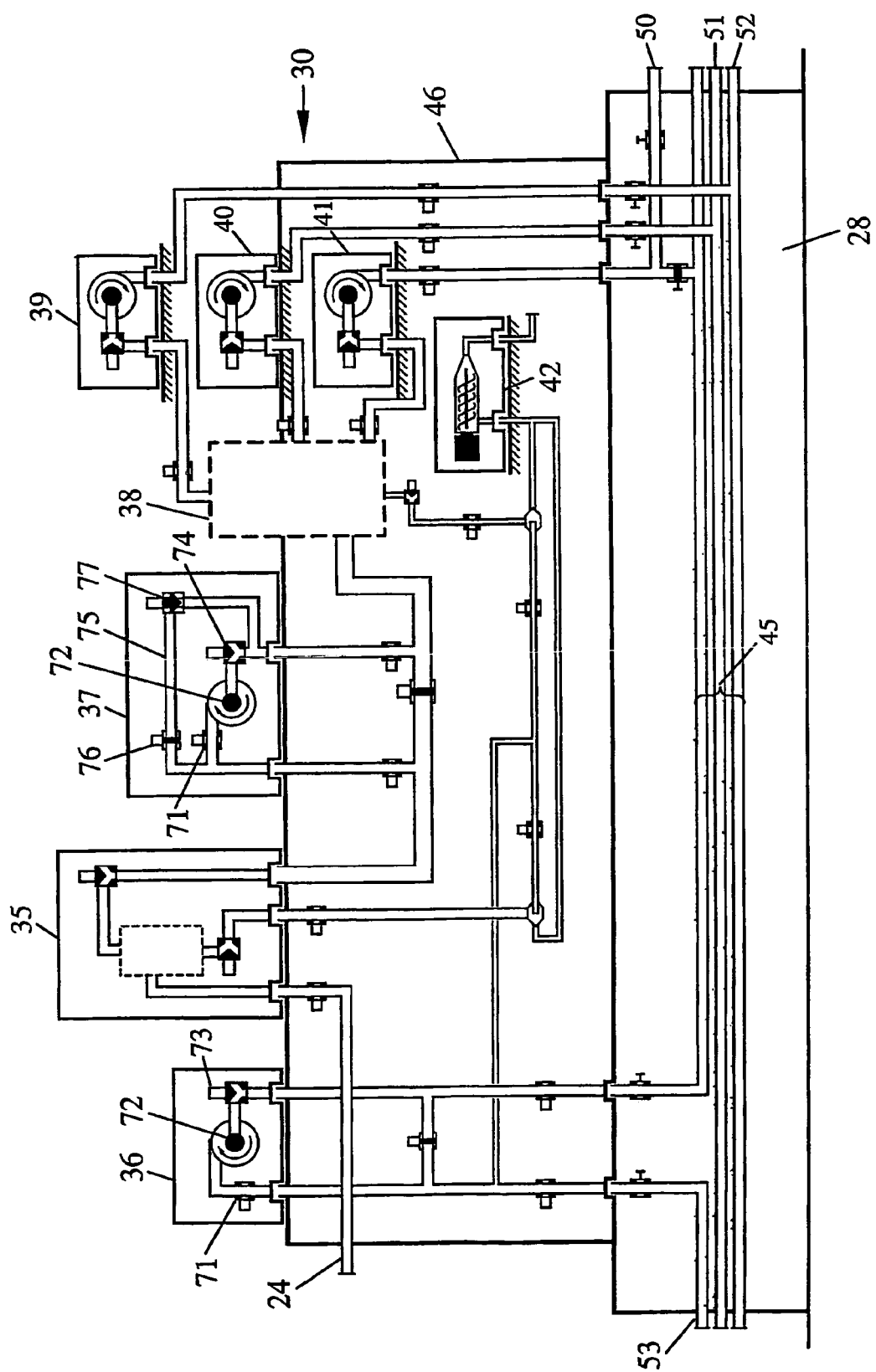
FIG. 5 is a schematic cross sectional view through a process module according to the present invention.
Figure 6:
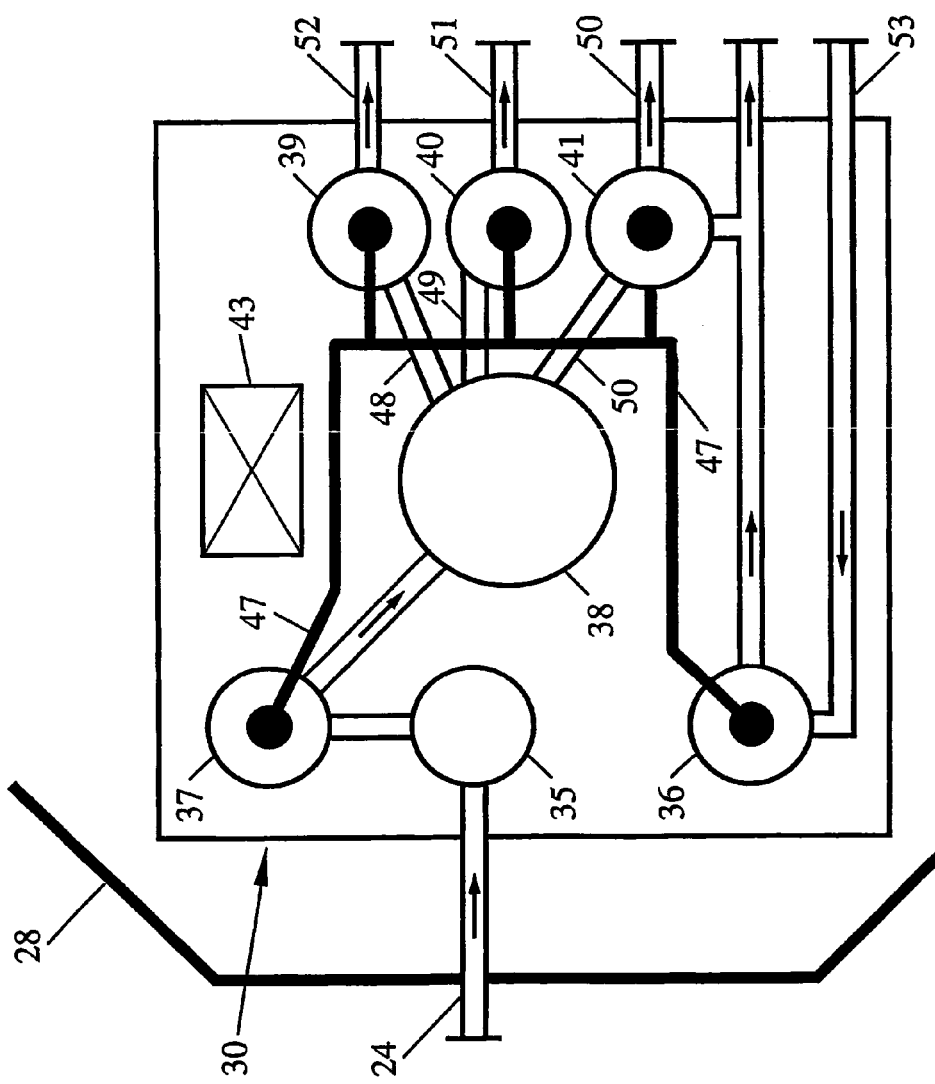
FIG. 6 is a schematic plan view of the module of FIG. 5.

FIGS. 5 and 6 show the schematic layout of one of the process modules 30. As can be seen in FIG. 5, the individual subsea process module 30 is based on a two-part module configuration that connects to the necessary pipe arrangements in the template 28. In this way, the process modules 30 can be disconnected from the template 28, for example to replace if worn, corroded or damaged or for cleaning, without the need to move all of the subsea structures to the surface. Basic ROV (Remote Operated Vehicle) or diver manual, isolation valves are in the piping mat of the template 28 to allow prime isolation with the flow lines. The lower part of the process module 30 consists of the static equipment for separation and the interconnecting pipework, having fail closed isolation valves. All the active components and moving machinery will be housed in mini modules to allow simple replacement from a service vessel. Within the mini modules, individual units will also be retrievable to enable simple replacement. The basic configuration consists of a set of mini modules as follows: a solids removal module 35, a well flow hydraulic power drive unit 37, a drive fluid hydraulic power drive unit 36, a series of pumps 39, 40, 41 for pumping the individual separated phases and a solids slurry pump 42. A control process module 43, shown in FIG. 6, is provided to control the active operation of the subsea process module 30. The control module 43 receives information from the surface so that it can manage independently the subsea process modules and the tree to which the module 30 is connected. A water injection hydraulic power drive unit 36 is provided to obtain energy from a water injection supply 53. These units 35, 36, 37, 39; 40,41, 42 and 43 can be classed as mini modules.

The solids removal module 35 takes in the multiphase flow at the wellhead pressure so that solids, in particular sand, can be removed prior to separation of the multiphase production flow. The solids removal module 35 takes in the wellhead pressure multiphase flow through pipeline 24.

The subsea process module 30 is mounted above a piping mat 45 in which the, main gas, oil and water pipelines are supported within the template 28. The process module consists of a base module 46 and the mini modules. The base module 46 is provided with a number of connection points for connection to the respective water 50, oil 51, gas 52 and drive fluid 53 pipelines in the piping mat 45. When the drive fluid is seawater, it is important to keep the drive fluid line 53 separate from the water line 50 to prevent the creation of undesirable salts. However, should the drive fluid be recycled water from line 50, it is permitted for the two lines to be mixed.

The individual mini modules 35, 36, 37, 39, 40, 41 and 42 are located above the base module 46, and in fluid connection therewith, for easy removal in case of damage or service requirements.

As can be seen from FIG. 6, the multiphase inlet line 24 feeds into the solids removal module 35 and from there on to the well stream hydraulic power drive unit 37. The well stream hydraulic power drive unit 37 is connected to the multi stage separator 38 and also to the hydraulic power system 47 which feeds, for example, single gas 39, oil 40 and water 41 pumps. The multistage separator system 38 has three separate outlet feeds 48, 49 and 50 which connect to the gas, oil and water pumps respectively. A water hydraulic power drive unit 36 is also connected to the hydraulic power system 47 for supplying complementary power to the individual pumps and is fed by the water drive line 53 and has an outlet through the water injection line 50 which also receives an input from the water pump 41. A control process module 43, which may receive instructions from a surface installation or maybe pre-programmed, is provided to control the subsea process module 30. Not shown is the chemical injection system for injecting chemicals at different points in the process module 30 for corrosion inhibitor, anti foaming, hydrate reducer, wax inhibiter or friction reducer.

Figure 7:
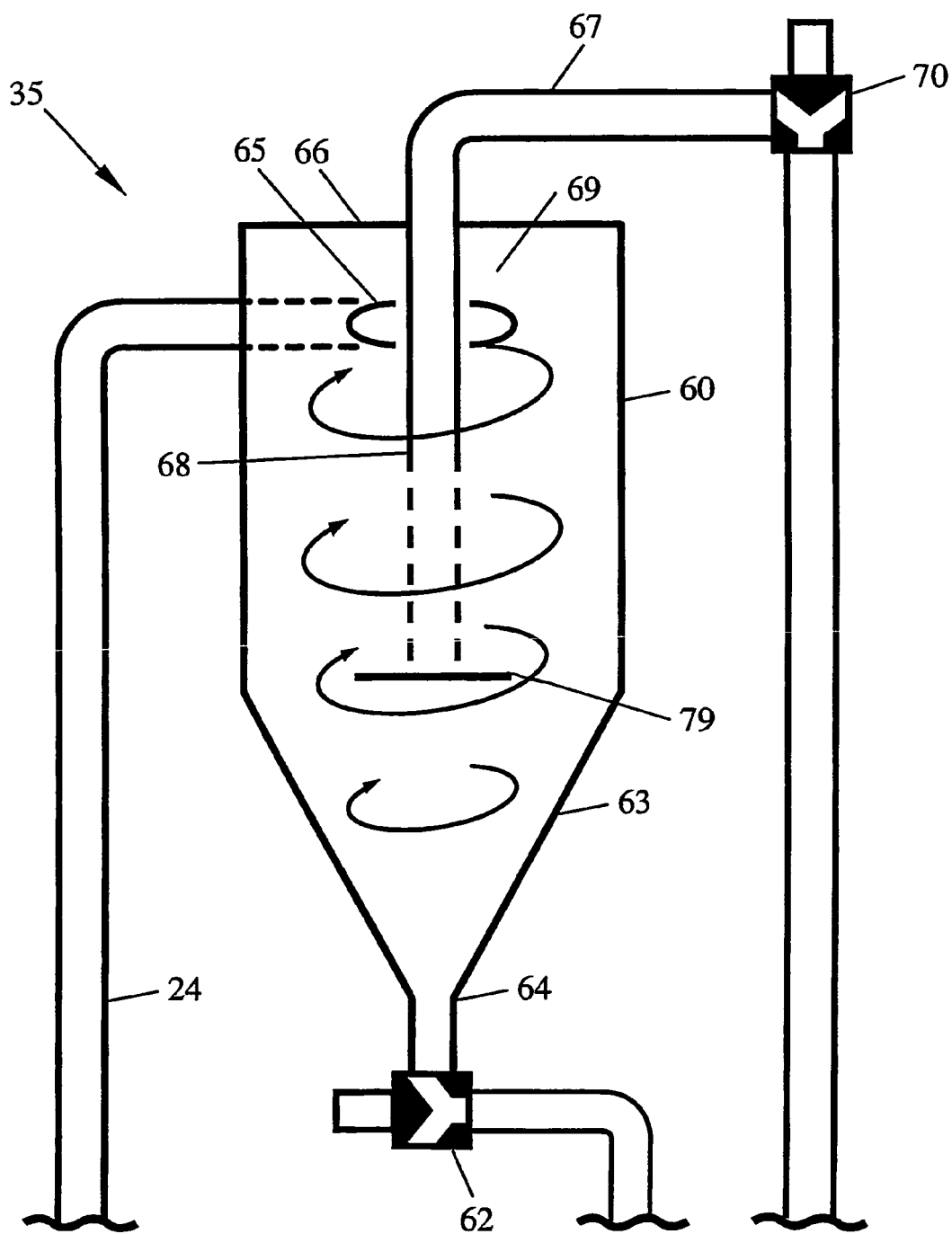
FIG. 7 is a schematic cross sectional view through a sand removal module which could be used in the module of FIG. 5.

The solids removal module 35 shown in FIG. 7 is a retrievable module consisting of a passive vertical housing 60 with a well flow control choke 70 down stream of the solids removal process and a small solids choke 62. The housing has generally vertical, cylindrical sides with the lower part tapering down into a conical part 63 having a single exit 64 for the solids. The multiphase flow enters the housing 60 tangentially at the upper end 65 of the housing, at a distance below the upper surface 66 of the housing.

The multiphase flow line 67 exits the top of the housing 60 substantially along the axis of the housing 60. The end 68 of the flow line 67 in the housing 60 is below the entry point 65 of the tangential flow, but above the top of the tapered conical section 63 and is provided with a vortex breaker 79.

Multiphase flow tangentially enters a gas zone 69 at high speed at the top of the housing where centrifugal separation occurs. This forces the solids to the outer portion of the housing 60 and, as the velocity drops, the solids move down towards the solids exit line 64. A solids/liquid sensor (not shown) allows a controlled escape of solids in a liquid solution in a slurry ratio into and through the solids choke 62 predetermined at least at a minimum so as to prevent a blockage.

The multiphase flow line 67 is provided with a choke 70 and, to maximise the energy from the well stream, it is preferable that this choke is fully open but is utilised on start up, close down and to control a peak flow prior to entering the well stream power drive unit 37.

The fluid power drive units 36, 37 as shown in FIG. 5 consists of isolation valves 71, a means of converting the energy of the fluid into mechanical power 72 which could be in a hydraulic power drive unit, to create a high pressure hydraulic drive fluid supply and a flow control mechanism (choke) 73, 74, respectively. The objective of the well stream power drive unit 37 is to maximize the available energy in the fluid stream and to cause a pressure drop to the required separator operating pressure. When this is the case, the choke 74 is fully open but at certain periods where a limited amount of power is required, the choke will be required to control the flow partially.

In the well stream power drive unit 37, the flow through the unit must meet fully the maximum through-put of the process systems. To achieve this, a by-pass path 75 is provided with a valve 76 and choke 77 which will be operated in close conjunction with the other functions in the power drive.

The fluid power drive unit 36 provides any additional power to the process module and the flow of fluid through the drive unit can be controlled by its choke 73.

In FIGS. 7 to 12 the gas liquid phase divider 80 is provided with a vortex mantel 89 and a vortex breaker 79. The column separator 82 is provided with a vortex ring 83 and a number of vortex plates or shrouds 84 (funnels 122, 126, 131 in FIG. 11). The purpose of each of these items is to prevent coning occurring or a vortex from being formed. This occurs when a fluid has separated into two clear phases, either into different layers in a "standing" or plug flow environment or into cylindrical or conical boundaries in a rotating environment. In this case, there is a tendency when one phase is drawn off for a low pressure area to be created. As this pressure differential increases, the boundary layer between the two phases is drawn down or up and a break through is likely to occur and such an occurrence is undesirable.

Figure 8:
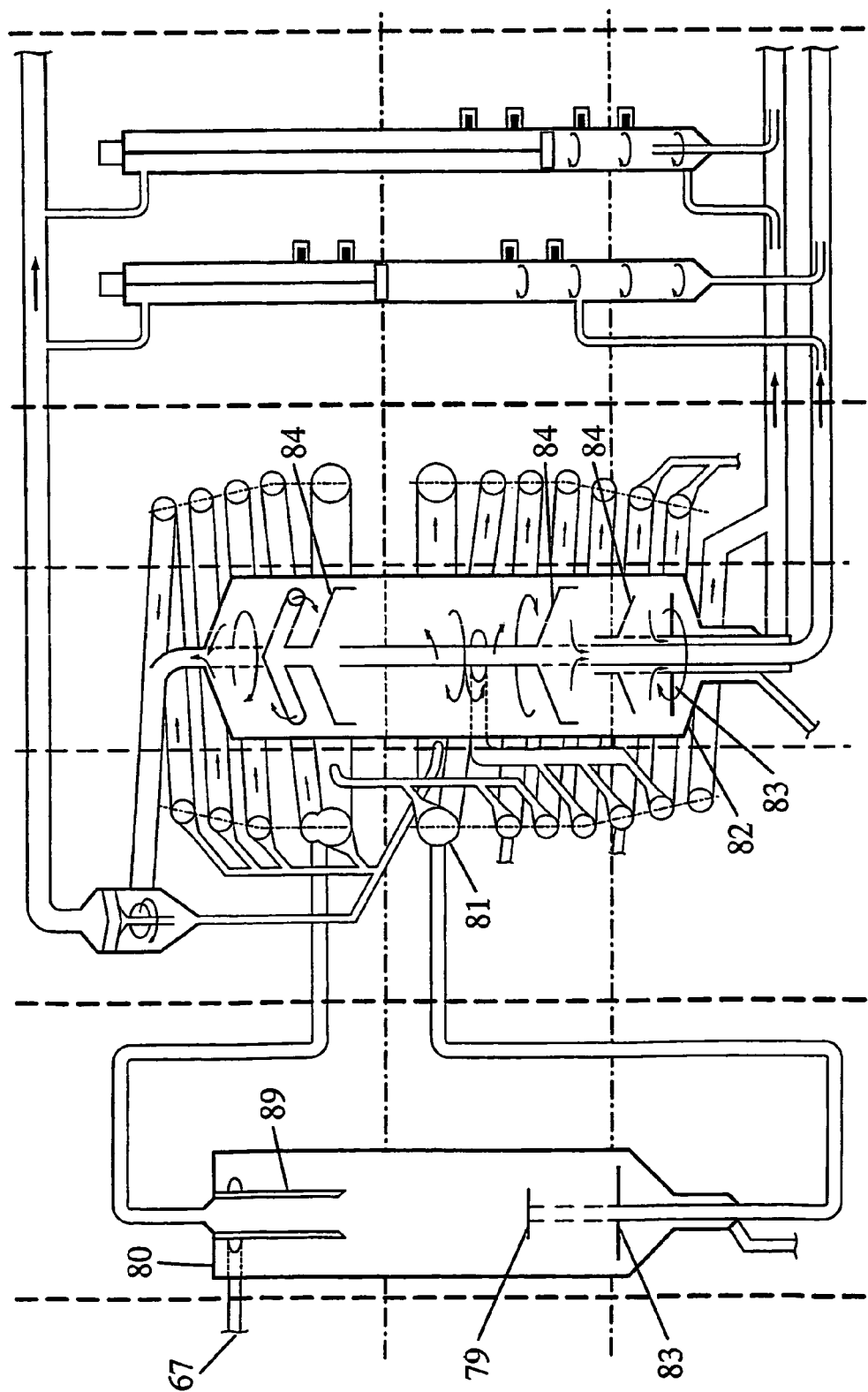
FIG. 8 is a schematic cross sectional view showing one form of separator which could be used in the module of FIG. 5.

In FIG. 8, one example of a multistage separator can be seen and, in this embodiment, it is a three stage separator having a first stage comprising a gas/liquid phase divider 80, a second stage comprising a toroidal separator 81 and a third stage comprising a column separator 82, all of which can maximise the flow rate and meet the burst and collapse pressure requirements.

All three stages have the ability to remove residual solids.

Figure 9:
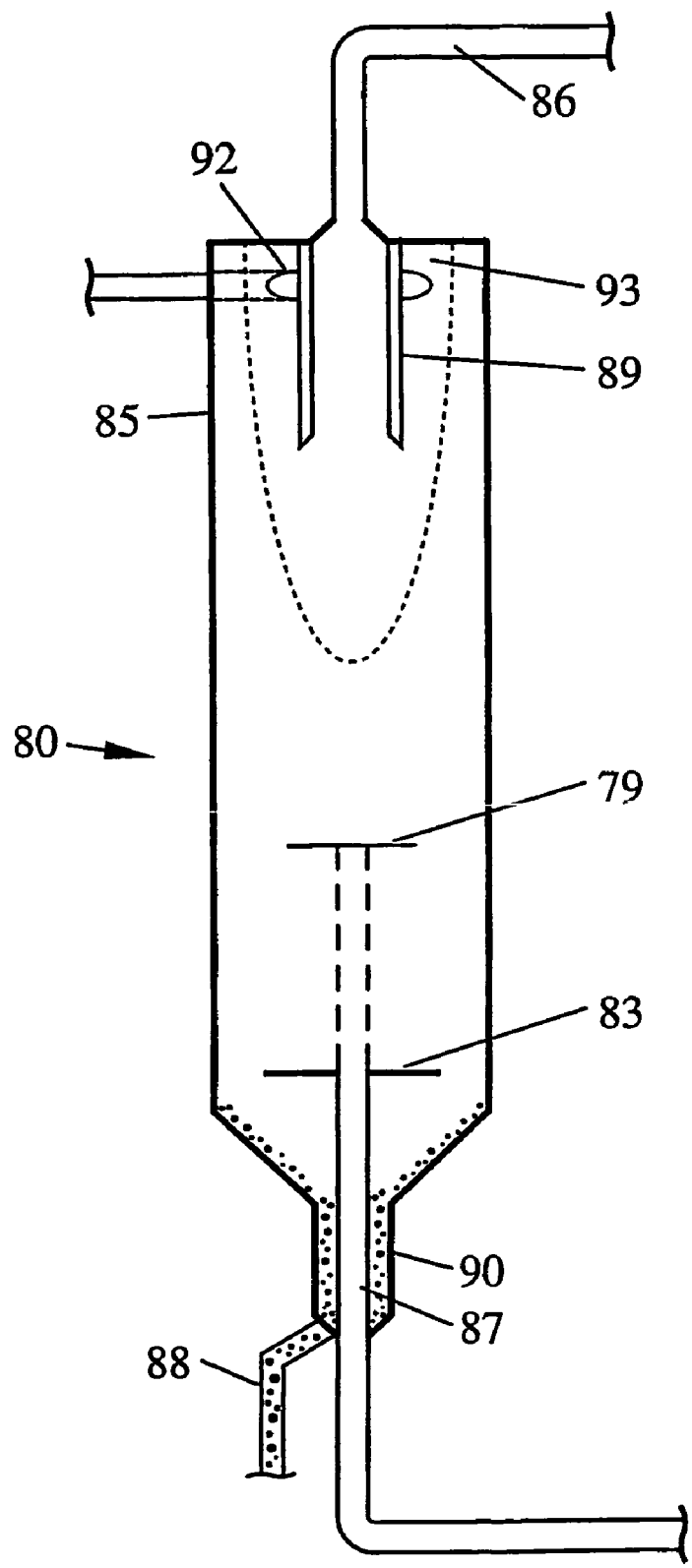
FIG. 9 is a schematic cross sectional view through a gas/liquid divider for use in the module of FIG. 5.

As can be seen in FIG. 9, the gas/liquid divider 80 is also a retrievable module formed by a passive vertical housing 85 having a wet gas exit line 86, coaxial with the housing and at the upper end thereof, and a bottom central multiphase liquid line 87, surrounded by a lower outer annulus solids exit 88.

The multiphase input flow enters the housing 80 at a tangential entry port 92 from the solids removal module 35.

As with the solids removal module 35, the multiphase entry port is below the top of the housing, but above the bottom of the top exit line, thereby allowing a gas void or cap 93 to form around the parallel wall section (vortex mantel) 89. This configuration encourages liquid centrifugal action on the wall and, therefore, further gas separation.

Figure 10:
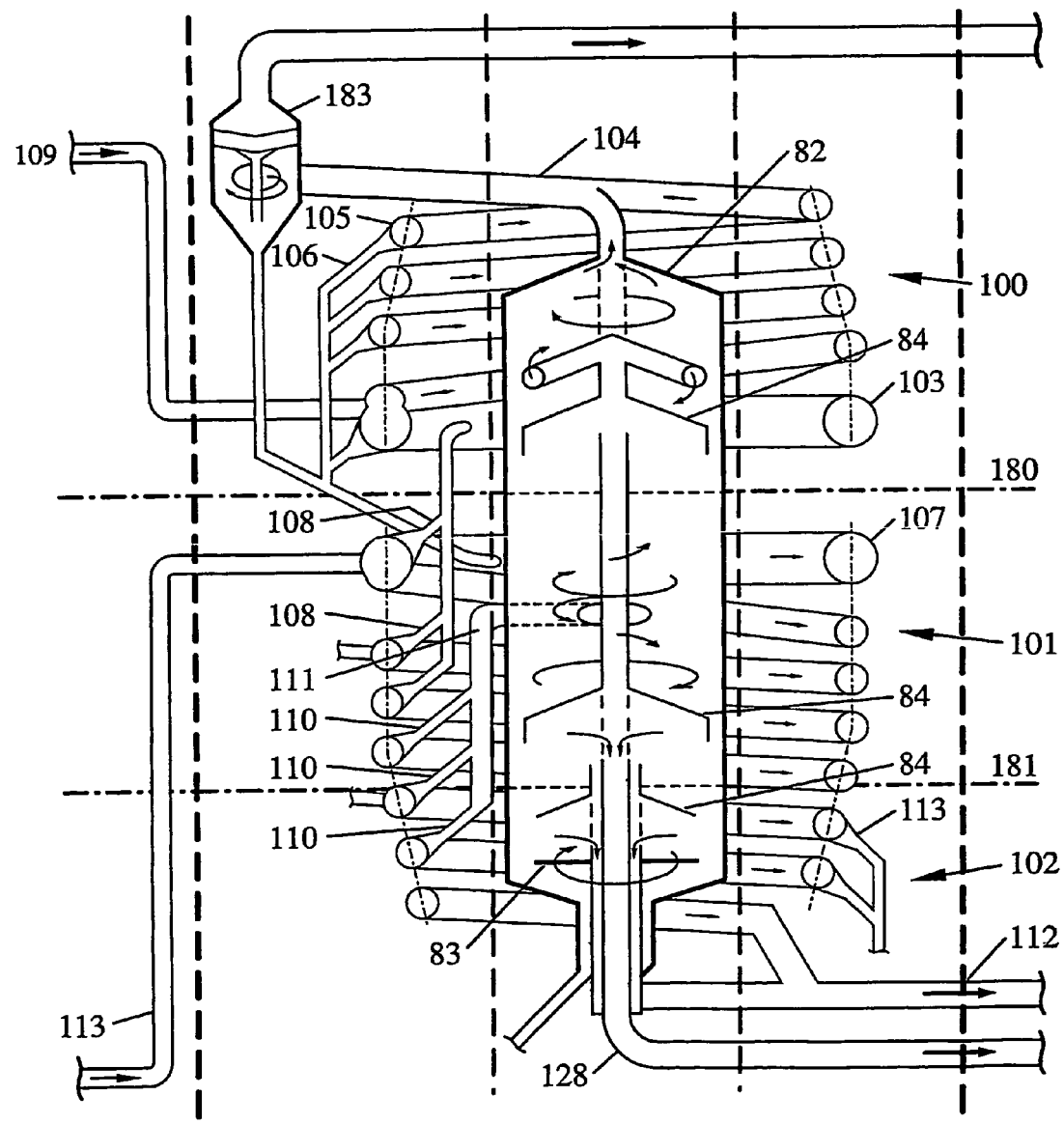
FIG. 10 is a schematic cross sectional view through a toroidal separator for use in the module of FIG. 5.

One form of a toroidal separator is shown in FIG. 10 and it is divided into three interlinking areas, an upper gas section 100, a central multiphase liquid section 101 and a lower water section 102.

Wet gas from the top of the gas/liquid divider 80 enters the bottom portion of the gas toroidal 103 and travels upwards through the gas section 100 to a gas outlet pipe 104. The liquid within the wet gas is forced onto the outer wall and collects. At certain points in the outer wall, liquid traps 105 and corresponding piping 106 are provided such that any liquid flows down to the central section 101.

The multiphase liquid with entrapped gas from the bottom of the gas/liquid device 80 enters through flow line 113 into the central section 101. The large bore toroidal 107 allows partial separation of the multiphase flow into standing layers. The remaining gas comes out of solution, forming a void on the inside top area of the bore 107. A vent line 108 from this region allows the gas to be forced up to combine with the wet gas in 103.

As the liquid spirals down and through the central section 101, the oil forms in the top inside bore area and the water in the lower outside bore area. Exit lines 110 are provided from the top inside area of the bore to allow oil to escape to a common line 111 which feeds the third stage separator 82.

At the lower end of the toroidal separator, a solids removal pipe or pipes 113 are provided to remove any additional solids which has entered the toroidal separator.

The lower end of the toroidal separator should now contain water which can be directly piped off along a water pipe line 112.

Figure 11:
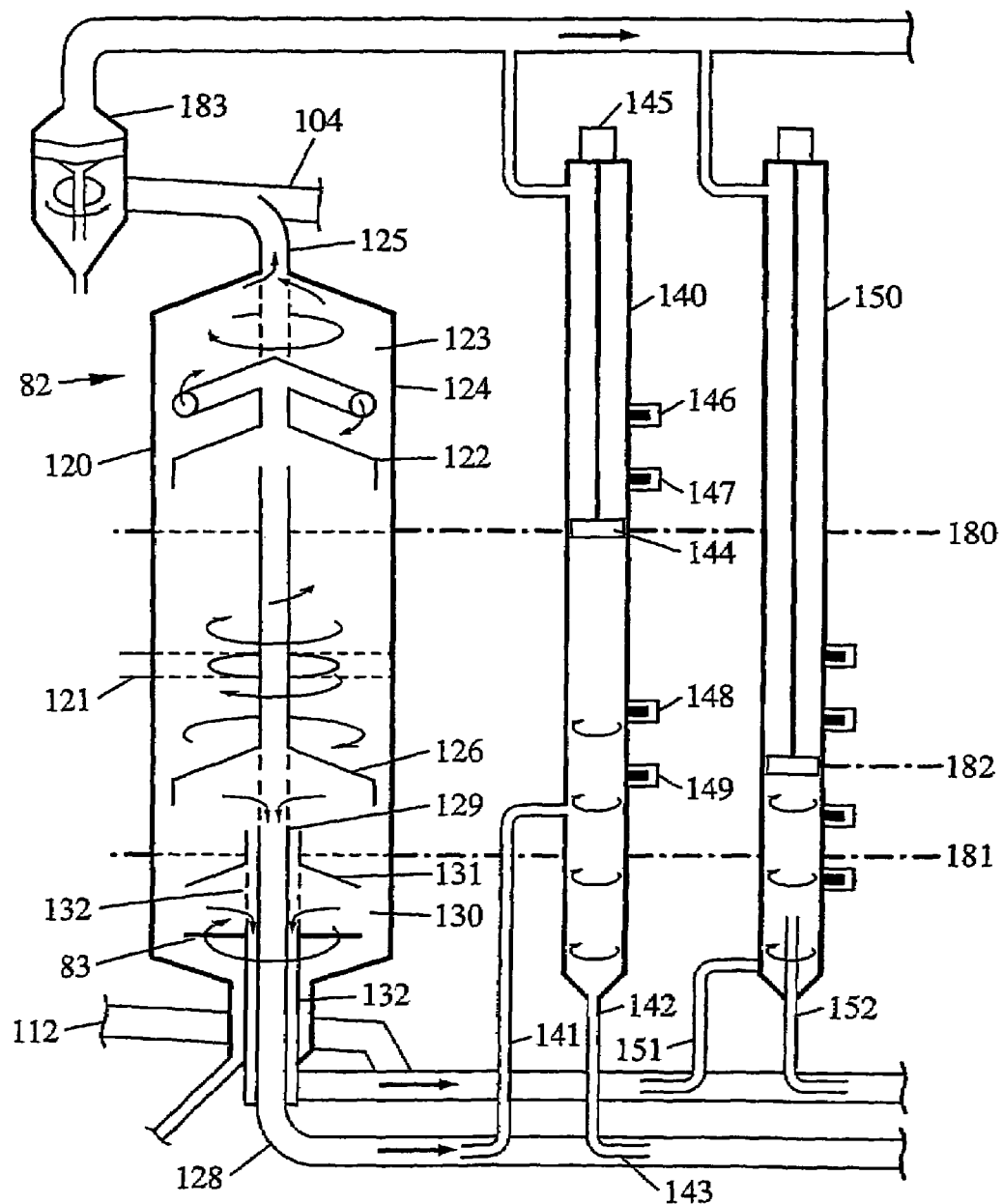
FIG. 11 is a schematic cross sectional view through a column separator which can 25 be used in the module of FIG. 5.

FIG. 11 shows the use of column separator 82 as the third stage of the separation process.

The use of a column separator is to remove any residual entrapped gas or water from the oil. A vertical housing 120 is provided into which the oil line 121 from the second stage (toroidal) separator enters the housing tangentially just below the gas/oil level, thereby causing a centrifugal flow on the wall of the housing.

This encourages any remaining gas to collect in the centre and this is removed from the oil through a vertical gas axial funnel 122, which then redirects the gas centrifugally into the gas void 123 to the upper wall 124 of the housing such that the gas exits through gas line 125 and joins the main gas outlet line 104 from the second stage separator.

The combined gas flow now flows through a demister unit 183 to remove any condensate. The condensate is drained off into the liquid section of the toroidal separator bore 107.

The liquid in the housing 120 rotates centrifugally in the central section to allow water droplets to be driven out of the oil towards the wall of the housing. The oil collects under a downwardly facing funnel 126 which funnels any remaining trapped gas up into the gas void below the gas axial funnel 122.

The oil under the funnel 126 is forced to move centrifugally into the centre of the housing, thereby providing final separation before exiting the separator through the oil line 128, the upper end 129 of which is located just beneath the funnel 126.

Water 130 collects beneath the oil zone and another downwardly facing funnel 131 is provided such that any small oil droplets which are in the water 130 are guided up into the oil zone. The water exits the lower end of the housing 120 through a central annular opening 132 which surrounds the oil line 128. A further annular opening surrounds the water outlet 132 so that any additional solids can be taken away. The exit from the water line 132 feeds into the water line 112 from the second stage separator. Two level sensors 140 and 150 are provided to aid control of the subsea process modules 30 in order that acceptable levels of the individual phase of gas, oil and water can be achieved throughout the process module 30. The level sensors 140, 150 offer a simple dual level sensing method, as the individual vertical measuring tubes 140, 150 have their top end connected to the exiting gas line, clear of the separator. The tubes are fed from the respective oil and water exit lines 112, 128 such that sample liquids are captured via feed lines 141 and 151.

The oil tube feed line 141 tangentially enters the tube 140 below the low/low design level and exits at the bottom of the tube 140 using a return line 142 into the oil exit line 128, using a venturi discharge 143. This therefore ensures a uniform centrifugal flow down through the tube 140 to prevent any droplets of water collecting as these would affect the density of the oil column.

For dual monitoring, it is proposed that a float 144 on a travel sensor 145 will register the gas/oil level 180. This will give a continuous read out of the particular level. To back this up, it is proposed that high/high 146, high 147, low 148 and low/low 149 fixed sensors are provided. This will provide a cross reference check on the float reading.

A similar tube 150 is provided for the water feed except that the feed pipe 151 enters the tube 150 tangentially at the lower end and exits through a exit line 152, the upper end of which is positioned above the entry point to ensure that any oil is removed by a vortex action resulting in a pure water column. This measures the gas/water level 182 from which the oil/water level 181 can be evaluated.

Figure 12:
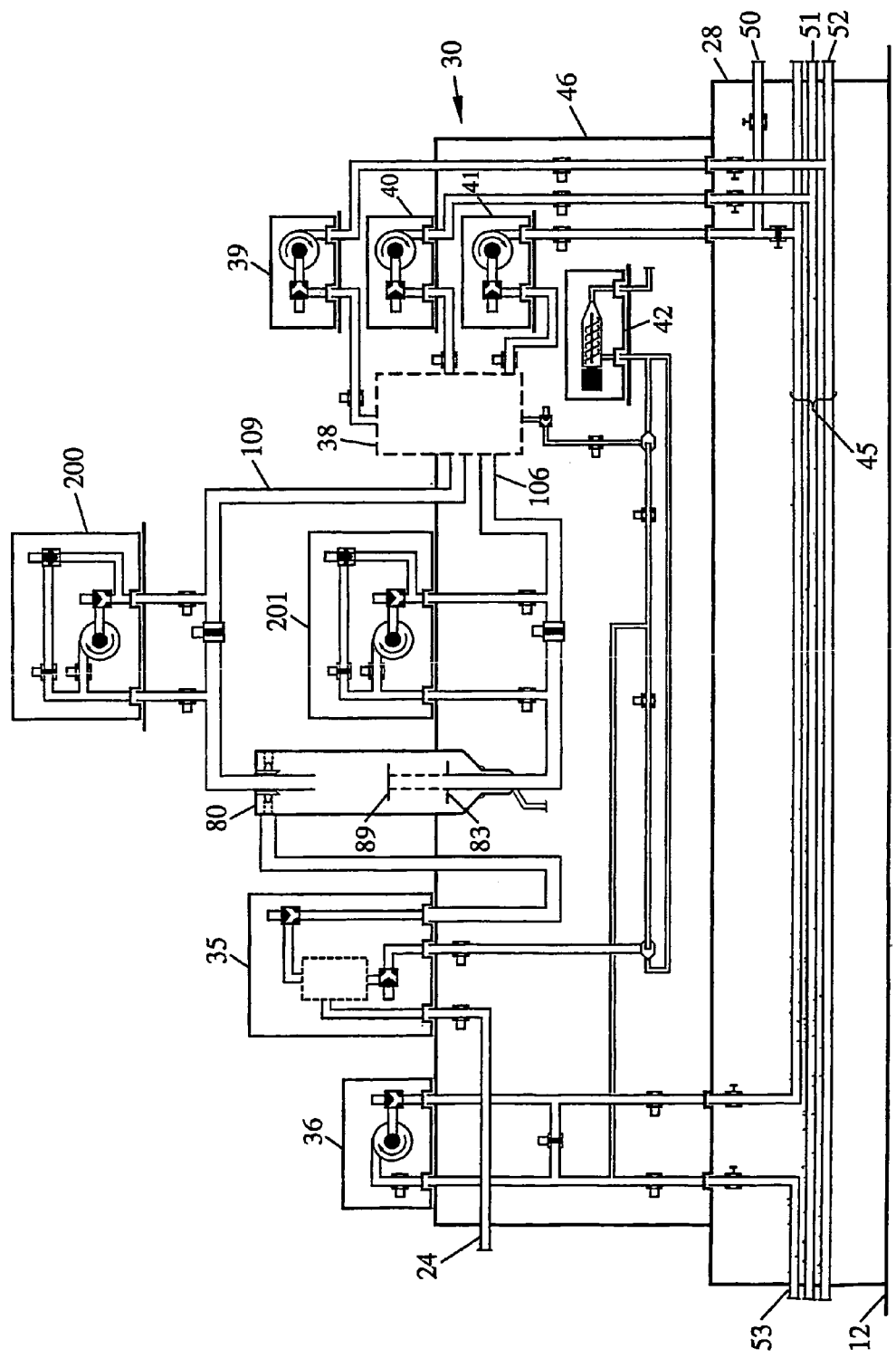
FIG. 12 is a schematic cross sectional view through a process module using dual power drive modules accordingly to the present invention.

The approach described covers a multiphase inlet flow which is predominately liquid with a high proportion of water. For a system with a high gas content, it is preferable to move the gas liquid divider upstream of the well stream hydraulic power drive module and instead have a separate flow-stream power drive module to handle the gas and another for the liquid. This is to improve the efficiency to obtain power from the well stream due to the different and conflicting operating parameters between gas and liquids. Such a system is shown in FIG. 12 with the multiphase fluid from the solids removal module 35 flowing into a gas/liquid divider 80. The gas from the gas/liquid divider 80 flows into a gas hydraulic power drive module 200 and the oil flows into a liquid hydraulic power drive module 201. The exits from gas and liquid hydraulic power drive modules now form the inlets to the second stage separator as per 109 and 106 respectively.

The invention claimed is:

1. A subsea process assembly for separating a multiphase flow, the assembly comprising:
    an inlet for the multiphase flow;
    a pressure reducing means for reducing the pressure of the multiphase flow from the inlet and creating a source of energy;

a multiphase separator for separating the multiphase flow into individual phases;

a pumping system for, in use, pumping at least one of the desired individual phases to a delivery point; and a power supply system that uses the source of energy from the pressure reducing means to selectively supply power to the pumping system.

2. A subsea process assembly according to claim 1, wherein the pressure reducing means is one of a hydraulic power device, electric power drive and a flow controller.

3. A subsea process assembly according to claim 1, further comprising a control process module for controlling the pressure reducing means and the pumping system.

4. A subsea process assembly according to claim 1, wherein the power supply system comprises a power drive unit that generates hydraulic power from an external energy source.

5. A subsea process assembly according to claim 4, wherein the external energy source is either in the form of fluid or electrical energy.

6. A subsea process assembly according to claim 5, wherein the power drive unit is driven by a fluid that provides energy in the form of liquid or gas.

7. A subsea process assembly according to claim 6, wherein the source of energy is achieved by creating a pressure differential in the multiphase flow between the inlet and the multiphase separator.

8. A subsea process assembly according to claim 1, further comprising a drive fluid inlet, the drive fluid being pumped to the module from an external point.

9. A subsea process assembly according to claim 8, wherein the pressure reducing means further comprises a means for creating a pressure differential in the drive fluid and thereby creating a further source of energy.

10. A subsea process assembly according to claim 8, wherein the drive fluid is water from a water injection supply.

11. A subsea process assembly according to claim 1, wherein the pressure of the multiphase flow is reduced to below 25 atmospheres.

12. A subsea process assembly according to claim 1, wherein the multistage separator can be formed by at least one of the following: a centrifugal container, a vortex tube, a cyclone, helix container or auger, a gravity vertical or horizontal tank, a silo, a conductor pile housing, toroidal ring, a toroidal spiral combination or a spiral.

13. A subsea process assembly according to claim 1 wherein the separating process can separate the multiphase fluid into at least two of the following: a solids slurry, gas, oil and water.

14. A subsea process assembly according to claim 1, further comprising an individual pump for each phase.

15. A subsea process assembly according to claim 14, wherein the individual phase pumps are driven by the energy created in the assembly.

16. A subsea process assembly according to claim 1 further comprising of a solids removal unit for removing a solids slurry prior to separation.

17. A subsea process assembly according to claim 1, further comprising a means for, in use, injecting exhaust water into a well.

18. A subsea process assembly according to claim 1, further comprising a template, a piping mat and a retrievable subsea process module.

19. A subsea process assembly according to claim 18, wherein the retrievable subsea process module comprises a retrievable base module and retrievable mini modules.

20. A subsea hydrocarbon recovery system comprising:
a subsea well for supplying a multiphase flow comprising a hydrocarbon;
a subsea process assembly comprising
an inlet for the multiphase flow;
a pressure reducing means for reducing the pressure of the multiphase flow from the inlet and creating a source of energy;
a multiphase separator for separating the multiphase flow into individual phases; and
a pumping system for, in use, pumping at least one of the desired individual phases to a delivery point, wherein the inlet to the assembly is in fluid communication with the well;
a power supply system that uses the source of energy from the pressure reducing means to selectively supply power to the pumping system; and
a delivery point for receiving the recovered hydrocarbon(s) from the subsea process assembly.

21. A subsea hydrocarbon recovery system according to claim 20, further comprising a well into which surplus products of the separation can be reinjected.

22. A subsea hydrocarbon recovery system according to claim 20, further comprising a plurality of subsea wells, each having an associated subsea process module which supplies the recovered hydrocarbon(s) to the same delivery point.

23. A subsea hydrocarbon recovery system according to claim 20, wherein the delivery point is one of a pipeline for removing the product flour the field, a water injection well, a gas injection well or a producing well to achieve artificial lift.

* * * * *